(12) United States Patent
Shin et al.

(10) Patent No.: US 7,294,419 B2
(45) Date of Patent: Nov. 13, 2007

(54) HIGH DENSITY MAGNETIC RECORDING MEDIUM HAVING UNIFORM LOCAL COERCIVITY DISTRIBUTION AND GRAIN SIZE DISTRIBUTION AND FINE GRAINS AND MANUFACTURING METHOD THEREOF

(75) Inventors: Sung-Chul Shin, Daejeon (KR); Mi-Young Im, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 91 days.

(21) Appl. No.: 10/675,735

(22) Filed: Sep. 29, 2003

(65) Prior Publication Data

US 2004/0170869 A1  Sep. 2, 2004

(30) Foreign Application Priority Data

Oct. 14, 2002  (KR) ...................... 10-2002-0062592

(51) Int. Cl.
*G11B 5/66* (2006.01)
*G11B 5/70* (2006.01)

(52) U.S. Cl. ..................................... 428/832

(58) Field of Classification Search ............. 428/832.1, 428/832, 834
See application file for complete search history.

(56) References Cited

U.S. PATENT DOCUMENTS 5,605,733 A * 2/1997 Ishikawa et al. ............ 428/828
5,879,783 A * 3/1999 Chang et al. ................ 428/141
5,900,323 A * 5/1999 Okamoto et al. ......... 428/831.2

OTHER PUBLICATIONS

Sun et al., Long-range order and short-range order study on CoCrPt/Ti films by synchrotron x-ray scattering and extended x-ray absorption fine structure spectroscopy, May 2002, J Appl Phys, vol. 91, No. 10, 7182-7184.*
An article entitled "Magnetic Recording Medium and Magnetic Disk Device", By Kenhi Sato, dated Aug. 31, 1999.
An article entitled "Direct Observation of non-Gaussian Distribution of Local . . . ", By Choe et al., dated 2002.

* cited by examiner

*Primary Examiner*—Holly Rickman
(74) *Attorney, Agent, or Firm*—Bachman & LaPointe, P.C.

(57) ABSTRACT

Disclosed is herein a magnetic recording medium useful for high density magnetic recording, which contains an optimum composition of Pt so as to have a uniform local coercivity distribution and grain size distribution, and fine grains, and a method of manufacturing the same. The magnetic recording medium includes a 400 Å $(Co_{82}Cr_{18})_{100-x}Pt_x/1100$ Å Ti alloy thin film containing 1 to 14 atom % Pt. Additionally, the method includes a first step of layering a Ti thin film on a glass substrate, a second step of depositing a CoCrPt alloy thin film on the Ti thin film, and a third step of depositing $Si_3N_4$ on the CoCrPt alloy thin film. At this time, the CoCrPt alloy thin film contains a predetermined composition of Pt controlled by a CoCr alloy target having a Pt chip positioned thereon. Thereby, the magnetic recording medium having microscopic magnetic property and structural property suitable to a high density magnetic recording medium is realized.

2 Claims, 5 Drawing Sheets

[fig 1]
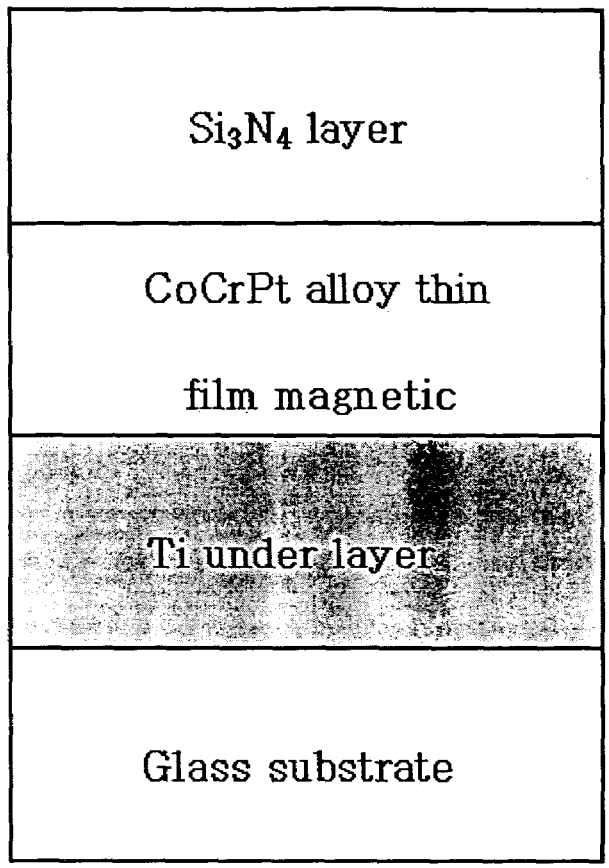
[fig2]
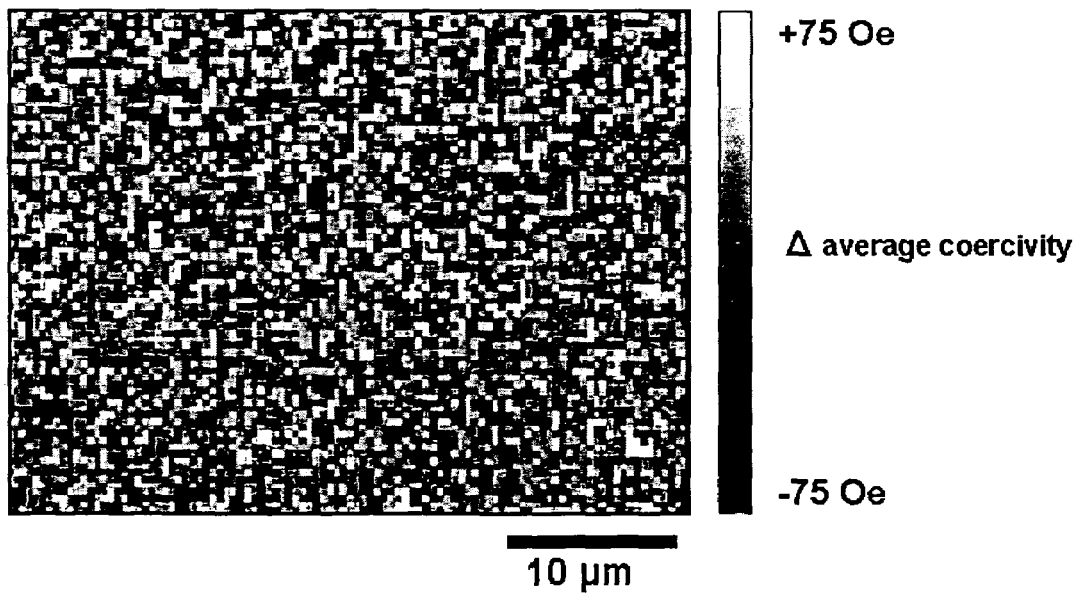

[fig 3a]
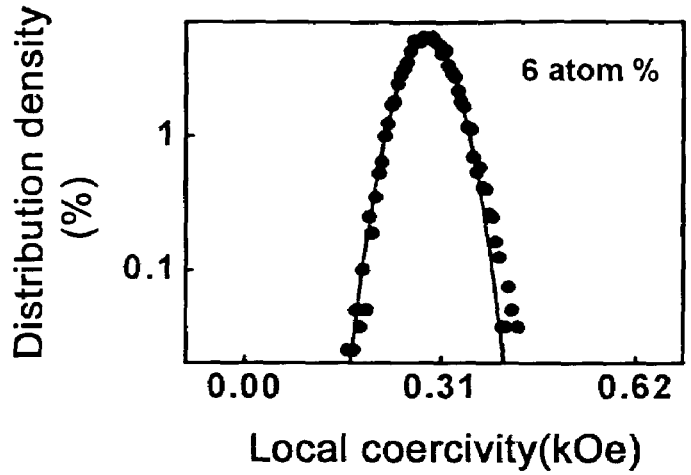
[fig 3b]
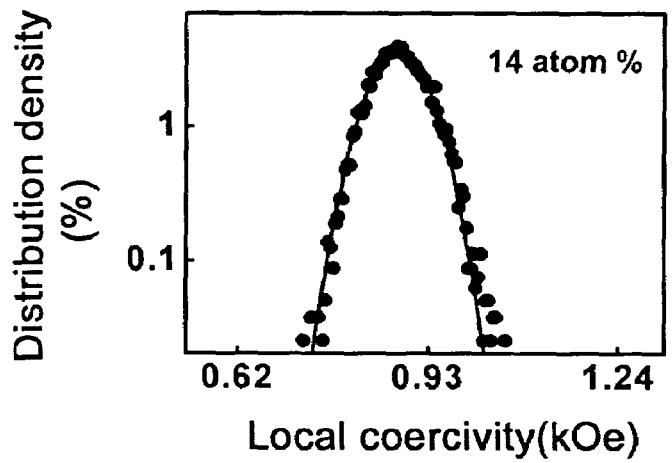
[fig 3c]
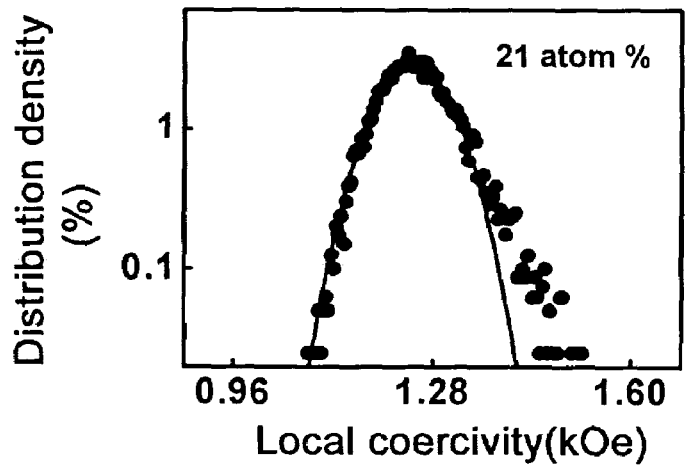

[fig 3d]
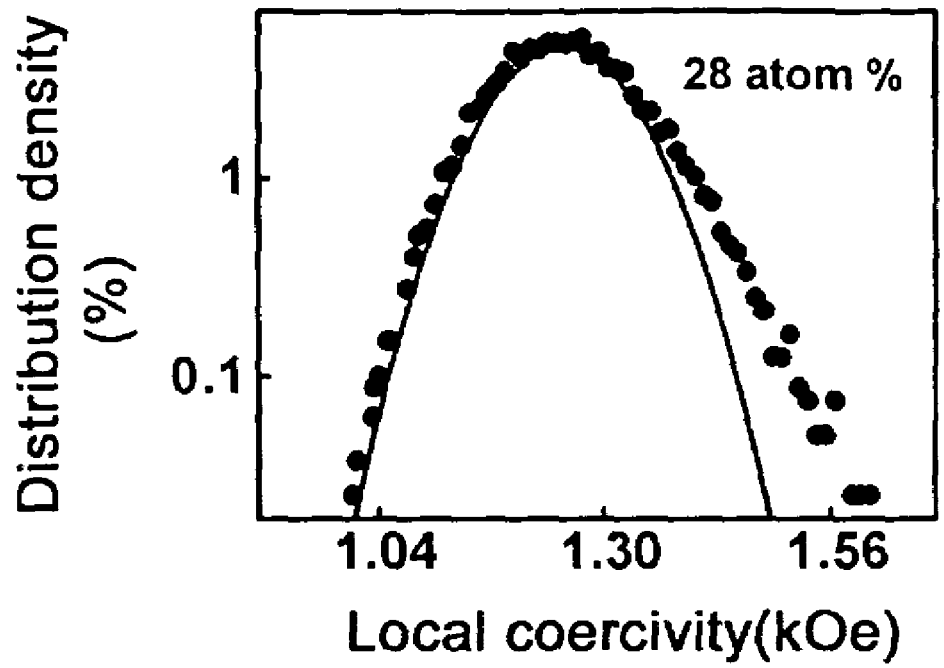
[[fig 4a]
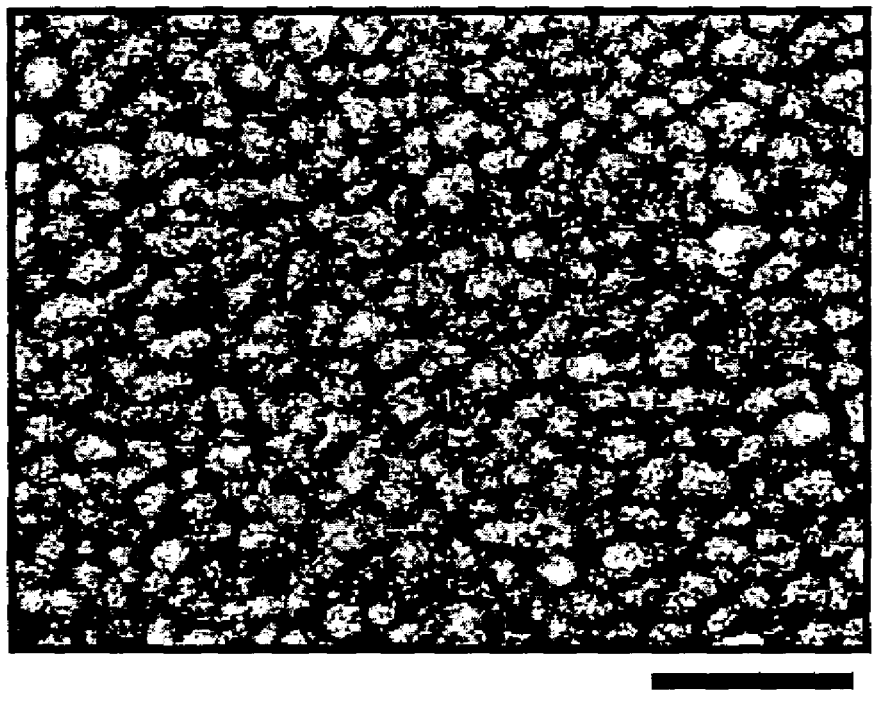
6 atom %

[fig 4b]
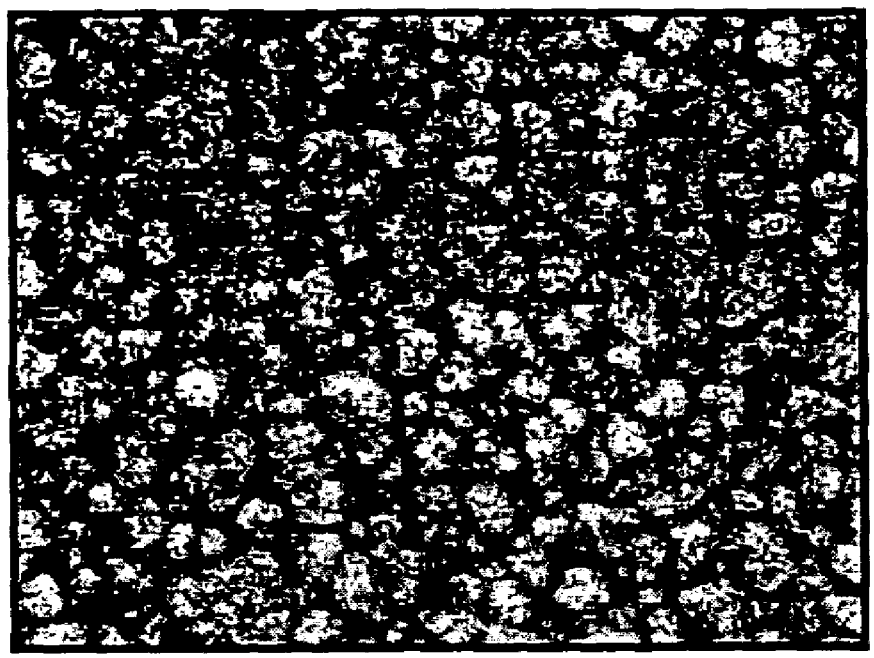
28 atom %
[fig 5a]
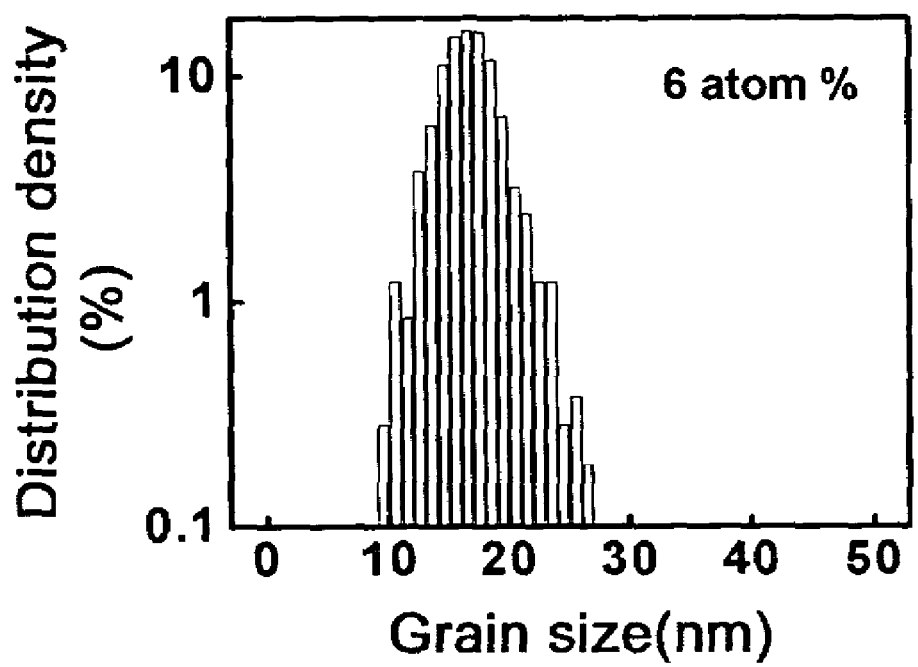

[fig 5b]
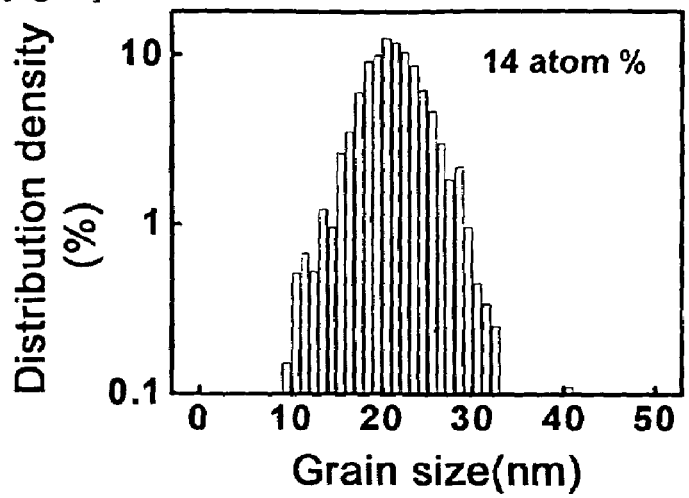
[fig 5c]
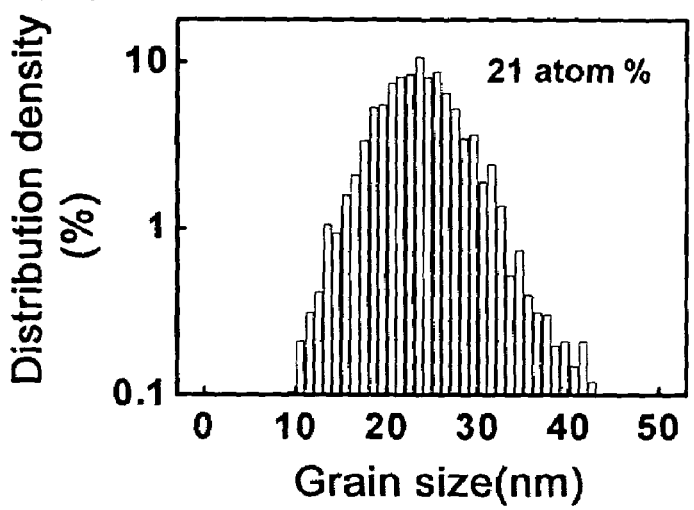
[fig 5d]
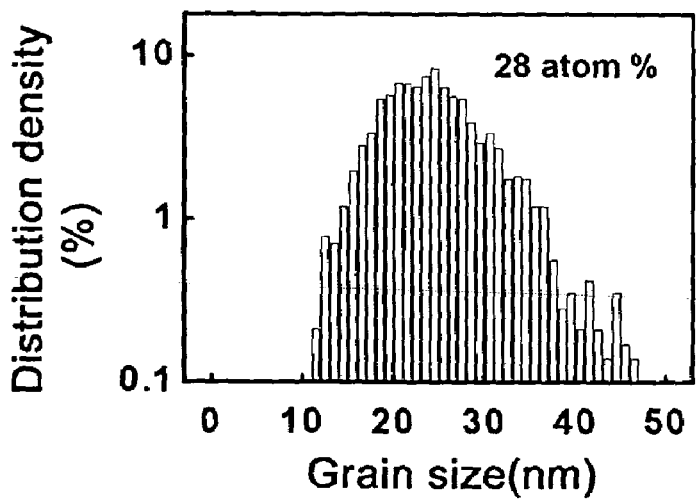

HIGH DENSITY MAGNETIC RECORDING MEDIUM HAVING UNIFORM LOCAL COERCIVITY DISTRIBUTION AND GRAIN SIZE DISTRIBUTION AND FINE GRAINS AND MANUFACTURING METHOD THEREOF

BACKGROUND OF THE INVENTION

1. Field of the Invention

The present invention pertains, in general, to a magnetic recording medium and, more particularly, to a high density magnetic recording medium including CoCrPt/Ti and fine grains, which has a uniform local coercivity distribution and grain size distribution, and a method of manufacturing the same.

2. Description of the Related Art

Currently, a thin film-shaped medium is usually used as a hard disk, and it is important to reduce the noise property amplified during amplifying a recording and a playback signal when a magnetic recording medium for the hard disk is used to realize a high density magnetic recording. In particular, grains in a magnetic layer must be fine and their sizes must be uniform so as to reduce a transition noise occurring by an interaction between the bits in transition regions between the bits, and the grains must be magnetically separated from each other to reduce an exchange coupling between the grains.

In the case of a perpendicular magnetic recording, the magnetic recording medium must secure thermal stability in a high density region, squareness of an M-H loop must approach 1, and its coercivity must be high in an allowable range of a recording sensitivity to stabilize stored information because the coercivity is an important factor functioning to prevent recorded information from being lost by neighboring magnetic fields. Furthermore, the degree of the perpendicular orientation of the magnetic recording medium must be very high, and local magnetic property of the magnetic recording medium must be uniform to realize the high density magnetic recording.

A CoCr alloy-based thin film has been most actively studied for utilizations as a perpendicular magnetic recording medium. A Co molecule having a hcp structure is a ferromagnetic substance, and has uniaxial crystalline magnetic anisotropy along a c-axis. When Cr is added to the Co molecule, the resulting mixture has high perpendicular magnetic anisotropy due to the uniaxial crystalline magnetic anisotropy improved by Co. Further, a composition segregation at interfaces between the grains caused by nonmagnetic Cr weakens an exchange interaction between the grains, thereby a medium noise which is one of problems occurring in regenerating information is reduced, and the perpendicular orientation of the columnar grains is improved. Accordingly, the CoCr alloy-based thin film has been continuously studied as a material of the high density magnetic recording medium with perpendicular magnetic anisotropy.

However, the CoCr binary alloy thin film has a limit in sufficiently increasing coercivity, improving the perpendicular magnetic anisotropy, and reducing the medium noise so as to realize the high density perpendicular magnetic recording medium. Accordingly, a CoCr binary alloy thin film including a third element has been developed.

Of various CoCr alloy thin films including the third element, CoCrPt alloy thin film has a relatively high coercivity and relatively large crystalline magnetic anisotropy in comparison with other CoCr-based alloy thin films, thus a recording medium including the CoCrPt alloy thin film has high output, strong perpendicular orientation, and large perpendicular magnetic anisotropy. Accordingly, many studies have been made of the CoCrPt alloy thin film.

However, the CoCrPt alloy thin film is disadvantageous in that when a great amount of Pt is added to the CoCrPt alloy thin film, the composition segregation at interfaces between the grains is weakened and the exchange interaction between the grains is strengthened even though the CoCrPt alloy thin film has a magnetic property suitable as the high density magnetic recording medium, thereby the medium noise is undesirably increased. Accordingly, many studies have been made to add a fourth element to the CoCrPt alloy thin film or to layer a underlayer including a nonmagnetic material on the CoCrPt alloy thin film to reduce the sizes of the grains, reduce the exchange interaction between the grains, and reduce the medium noise, thereby realizing the magnetic recording medium having low noise property as well as high coercivity, magnetic anisotropy, and squareness ratio.

For example, U.S. Pat. No. 5,049,451 (Lal, Brij B et al.) discloses a magnetic recording medium having CoCrTaPt, which includes CoCr, 3 to 20 atom % Pt, and 2 to 10 atom % Ta, thereby having low medium noise as well as high coercivity and squareness ratio. Furthermore, U.S. Pat. No. 4,929,514 (Natarajan, Bangalore R. et al.) proposes a recording medium, in which a magnetic layer including 60 to 80 atom % Co, 5 to 20 atom % Cr, and 1 to 20 atom % Pt is layered on a underlayer including Cr or a Cr alloy, thereby having high coercivity and low medium noise.

However, the prior arts about the magnetic recording medium including CoCrPt suggest no microscopic observation of magnetic properties. For example, a local coercivity distribution greatly affects to determine a magnetic domain inverse behavior of a thin film, thus the local coercivity distribution must be observed so as to realize the high density magnetic recording medium. However, in the prior arts, no study of the local coercivity distribution is made because of technical limits.

SUMMARY OF THE INVENTION

Accordingly, the present invention has been made keeping in mind the above problems occurring in the prior art, and an aspect of the present invention is to provide a magnetic recording medium including CoCrPt alloy thin film, which has preferable microscopic magnetic properties such as uniform local coercivity distribution sensitively depending on a structure of an alloy thin film, uniform grain size distribution, and fine grains, thereby securing structural properties suitable as a high density magnetic recording medium, and a method of manufacturing the same. At this time, after plural CoCrPt alloy thin films including different compositions of Pt are manufactured, the local coercivity distribution of each CoCrPt alloy thin film is measured, thereby the magnetic recording medium containing an optimum composition of Pt is manufactured.

Additional aspects and/or advantages of the invention will be set forth in part in the description which follows and, in part, will be obvious from the description, or may be learned by practice of the invention.

The above and/or other aspects are achieved by providing a high density magnetic recording medium, which has a uniform local coercivity distribution and grain size distribution, and fine grains, including a CoCrPt alloy thin film including the $(Co_{82}Cr_{18})_{100-x}Pt_x$ alloy thin film containing 1 to 14 atom % Pt, and a Ti thin film positioned under the $(Co_{82}Cr_{18})_{100-x}Pt_x$ alloy thin film.

Additionally, the above and/or other aspects are achieved by providing a high density magnetic recording medium including a glass substrate, a Ti thin film with a thickness of 1100 Å, a $(Co_{82}Cr_{18})_{100-x}Pt_x$ thin film with a thickness of 400 Å containing 1 to 14 atom % Pt, and a $Si_3N_4$ thin film with a thickness of 500 Å.

Furthermore, the above and/or other aspects are achieved by providing a method of manufacturing a high density magnetic recording medium which has a uniform local coercivity distribution and grain size distribution, and fine grains, including a first step of layering a Ti thin film on a glass substrate, a second step of depositing a CoCrPt alloy thin film on the Ti thin film in a deposition rate of 14 Å/s, and a third step of depositing $Si_3N_4$ on the CoCrPt alloy thin film. At this time, the CoCrPt alloy thin film contains a predetermined composition of Pt controlled by a CoCr alloy target having a Pt chip positioned thereon under sputtering pressure of 3 mtorr.

According to the present invention, it can be seen that microscopic magnetic property and structural property useful in a high density magnetic record are satisfied by a 400 Å $(Co_{82}Cr_{18})_{100-x}Pt_x/1100$ Å Ti alloy thin film containing 1 to 14 atom % Pt. At this time, it is preferable that a composition of Pt is 14 atom % or less. The reason for this is that when the composition of Pt is more than 14 atom %, a local coercivity distribution and a grain size distribution become nonuniform, and each grain size is enlarged, thus properties undesirable as a high density magnetic recording medium are obtained.

BRIEF DESCRIPTION OF THE DRAWINGS

This and other aspects and advantages of the invention will become apparent and more readily appreciated from the following description of the preferred embodiments, taken in conjunction with the accompanying drawings of which:

FIG. 1 schematically illustrates a sectional view of a magnetic recording medium including a 400 Å $(Co_{82}Cr_{18})_{100-x}Pt_x/1100$ Å Ti alloy thin film;

FIG. 2 illustrates a local coercivity distribution map of a magnetic recording medium including a 400 Å $(Co_{82}Cr_{18})_{94}Pt_6/1100$ Å Ti alloy thin film measured on a spatial resolution of 400 nm;

FIG. 3a to 3d illustrate graphs showing distribution densities as a function of local coercivities for magnetic recording media including 400 Å $(Co_{82}Cr_{18})_{100-x}Pt_x/1100$ Å Ti alloy thin films which contain respectively 6 atom % Pt, 14 atom % Pt, 21 atom % Pt, and 28 atom % Pt;

FIGS. 4a and 4b illustrate scanning electron microscope pictures of magnetic recording media respectively including a 400 Å $(Co_{82}Cr_{18})_{94}Pt_6/1100$ Å Ti alloy thin film and a 400 Å $(Co_{82}Cr_{18})_{72}Pt_{28}/1100$ Å Ti alloy thin film; and FIG. 5 illustrates graphs showing distribution densities as a function of grain sizes for magnetic recording media including 400 Å $(Co_{82}Cr_{18})_{100-x}Pt_x/1100$ Å Ti alloy thin films which contain respectively 6 atom % Pt, 14 atom % Pt, 21 atom % Pt, and 28 atom % Pt.

DETAILED DESCRIPTION OF THE PREFERRED EMBODIMENTS

Reference will now be made in detail to the present preferred embodiments of the present invention, examples of which are illustrated in the accompanying drawings, wherein like reference numerals refer to like elements throughout.

With reference to FIG. 1, there is schematically illustrated a sectional view of a magnetic recording medium including a 400 Å $(Co_{82}Cr_{18})_{100-x}Pt_x/1100$ Å Ti alloy thin film. At this time, a composition of Pt contained in the magnetic recording medium may be varied. According to the present invention, CoCrPt alloy thin film samples are manufactured in accordance with a dc-magnetron sputtering process. In order to improve the perpendicular crystal orientation of the magnetic recording medium, a Ti underlayer is layered on a glass substrate, and a CoCrPt alloy thin film is deposited on the Ti underlayer. Additionally, $Si_3N_4$ is deposited on the CoCrPt alloy thin film so as to prevent the CoCrPt alloy thin film samples from oxidizing and to increase a Kerr rotation angle. At this time, a $Si_3N_4$ layer is 500 Å in thickness. When the CoCrPt alloy thin film is manufactured in accordance with the sputtering process, a composition of Pt contained in the CoCrPt alloy thin film is controlled using a CoCr alloy target and a Pt chip, and the CoCrPt alloy thin film is formed on the glass substrate at room temperature.

Referring to FIG. 2, there is illustrated a local coercivity distribution map of a magnetic recording medium including a 400 Å $(Co_{82}Cr_{18})_{94}Pt_6/1100$ Å Ti alloy thin film measured on a spatial resolution of 400 nm. At this time, the local coercivity distribution is obtained from coercivities simultaneously measured at 8000 local regions each having a size of 400 nm×400 nm, and the coercivities are randomly distributed as shown in FIG. 2. This means that the adjacent local regions each have an independent magnetic property, that is, independent coercivity.

Turning to FIG. 3a to 3d, there are illustrated graphs showing distribution densities as a function of local coercivities for magnetic recording media including 400 Å $(Co_{82}Cr_{18})_{100-x}Pt_x/1100$ Å Ti alloy thin films which contain respectively 6 atom % Pt, 14 atom % Pt, 21 atom % Pt, and 28 atom % Pt. In FIG. 3a to 3d, the local coercivity distribution is simultaneously obtained by a Kerr hysteresis loop measurement at 8000 local regions, and normalized using the total number of the local regions. In this regard, an interval between the coercivities is 10 Oe.

From FIG. 3a to 3d, it can be seen that the 400 Å $(Co_{82}Cr_{18})_{100-x}Pt_x/1100$ Å Ti alloy thin film including 14 atom % or less Pt has the local coercivity distribution corresponding to a normal distribution. The reason why the local coercivity distribution of the 400 Å $(Co_{82}Cr_{18})_{100-x}Pt_x/1100$ Å Ti alloy thin film including 14 atom % or less Pt corresponds to the normal distribution is that the adjacent local regions each have independent coercivity and coercivities of the local regions are uniformly distributed. On the other hand, the 400 Å $(Co_{82}Cr_{18})_{100-x}Pt_x/1100$ Å Ti alloy thin film including 14 atom % or more Pt has the local coercivity distribution corresponding to an abnormal distribution. The reason for this is that the adjacent local regions magnetically interact with each other. Furthermore, a distribution type as well as a distribution width of the local coercivity distribution is varied according to a composition of Pt. For example, the distribution width of the local coercivity distribution is increased from 0.17 kOe to 0.34 kOe with the composition of Pt increasing.

Accordingly, it can be seen that the magnetic recording medium including the 400 Å $(Co_{82}Cr_{18})_{100-x}Pt_x/1100$ Å Ti alloy thin film containing 14 atom % or less Pt has a narrow and uniform local coercivity distribution, thus it is useful as a high density magnetic recording medium.

FIGS. 4a and 4b illustrate scanning electron microscope pictures of magnetic recording media respectively including a 400 Å $(Co_{82}Cr_{18})_{94}Pt_6/1100$ Å Ti alloy thin film and a 400 Å $(Co_{82}Cr_{18})_{72}Pt_{28}/1100$ Å Ti alloy thin film. As shown in FIG. 4a, the 400 Å $(Co_{82}Cr_{18})_{94}Pt_6/1100$ Å Ti alloy thin film includes relatively small grains isolated from each other by the composition segregation at interfaces between the grains. On the other hand, the 400 Å $(Co_{82}Cr_{18})_{72}Pt_{28}/1100$ Å Ti alloy thin film has relatively large grains, and the weakened composition segregation at the interfaces between the grains. Hence, a structure of the 400 Å $(Co_{82}Cr_{18})_{100-x}Pt_x/1100$ Å Ti alloy thin film including 28 atom % Pt is unsuitable as the high density magnetic recording medium because the exchange interaction between the adjacent grains is strengthened to reduce a recording density and increase the medium noise of the magnetic recording medium.

Referring to FIG. 5a to 5d, there are illustrated graphs showing distribution densities as a function of grain sizes for magnetic recording media including 400 Å $(Co_{82}Cr_{18})_{100-x}Pt_x/1100$ Å Ti alloy thin films which contain respectively 6 atom % Pt, 14 atom % Pt, 21 atom % Pt, and 28 atom % Pt. As shown in FIG. 5a to 5d, the 400 Å $(Co_{82}Cr_{18})_{100-x}Pt_x/1100$ Å Ti alloy thin film including 14 atom % or less Pt has a grain size distribution corresponding to a normal distribution. On the other hand, the grain size distribution of the 400 Å $(Co_{82}Cr_{18})_{100-x}Pt_x/1100$ Å Ti alloy thin film including 14 atom % or more Pt conforms to an abnormal distribution.

Therefore, it can be seen that the magnetic recording medium including the 400 Å $(Co_{82}Cr_{18})_{100-x}Pt_x/1100$ Å Ti alloy thin film containing 14 atom % or less Pt has fine grains and the uniform grain size distribution, thereby it is useful as the high density magnetic recording medium.

As apparent from the above description, the present invention provides a magnetic recording medium which contains an optimum content of Pt so as to secure microscopic magnetic property and structural property suitable to a high density magnetic recording medium. Therefore, the magnetic recording medium has a uniform local coercivity distribution and grain size distribution, and fine grains, thereby realizing the high density magnetic recording medium.

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

What is claimed is:

1. A high density magnetic recording medium, which has a uniform local coercivity distribution and grain size distribution, and fine grains, comprising: a CoCrPt alloy thin film including the $(Co_{82}Cr_{18})_{100-x}Pt_x$ alloy thin film containing 1 to 14 atom % Pt; and a Ti thin film positioned under the $(Co_{82}Cr_{18})_{100-x}Pt_x$ alloy thin film, wherein the $(Co_{82}Cr_{18})_{100-x}Pt_x$ alloy thin film and the Ti thin film are respectively 400 and 1100 Å in thickness.

2. A high density magnetic recording medium using a CoCrPt alloy thin film, which has a uniform local coercivity distribution and grain size distribution, and fine grains, comprising: a glass substrate; a Ti thin film layered on the glass substrate; a $(Co_{82}Cr_{18})_{100-x}Pt_x$ alloy thin film containing 1 to 14 atom % Pt and deposited on the Ti thin film; and a $Si_3N_4$ thin film deposited on the $(Co_{82}Cr_{18})_{100-x}Pt_x$ alloy thin film, wherein the $(Co_{82}Cr_{18})_{100-x}Pt_x$ alloy thin film, the Ti thin film, and the $Si_3N_4$ thin film are respectively 400, 1100, and 500 Å in thickness.

* * * * *